(12) United States Patent
Tonouchi

(10) Patent No.: US 11,231,894 B2
(45) Date of Patent: Jan. 25, 2022

(54) PRINTING PROCESS MANAGEMENT APPARATUS AND NON-TRANSITORY COMPUTER READABLE MEDIUM

(71) Applicant: FUJIFILM Business Innovation Corp., Tokyo (JP)

(72) Inventor: Masaharu Tonouchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 284 days.

(21) Appl. No.: 16/352,840

(22) Filed: Mar. 14, 2019

(65) Prior Publication Data
US 2019/0377533 A1 Dec. 12, 2019

(30) Foreign Application Priority Data

Jun. 11, 2018 (JP) .............................. JP2018-111145

(51) Int. Cl.
*G06F 3/12* (2006.01)

(52) U.S. Cl.
CPC .......... *G06F 3/1294* (2013.01); *G06F 3/1203* (2013.01); *G06F 3/1211* (2013.01); *G06F 3/1282* (2013.01)

(58) Field of Classification Search
CPC .... G06F 3/1294; G06F 3/1203; G06F 3/1211; G06F 3/1282
See application file for complete search history.

(56) References Cited

U.S. PATENT DOCUMENTS

| 2005/0141006 A1* | 6/2005 | Aiyama | ............... G06K 15/007 |
| | | | 358/1.13 |
| 2011/0261402 A1* | 10/2011 | Yamamoto | ............ G06F 21/608 |
| | | | 358/1.15 |
| 2014/0156468 A1* | 6/2014 | Tamagawa | ......... G06Q 30/0635 |
| | | | 705/26.81 |

FOREIGN PATENT DOCUMENTS

JP 2017-049848 3/2017

\* cited by examiner

*Primary Examiner* — Moustapha Diaby
(74) *Attorney, Agent, or Firm* — JCIPRNET

(57) ABSTRACT

A printing process management apparatus includes a display unit that displays product identification information regarding a print product, including print information, and group identification information regarding a group, including the print information as a processing unit, while associating the product identification information and the group identification information with each other, a reception unit that receives an instruction to switch a display mode of the display unit and displays management information indicating a processing state of print information in one of at least two display modes comprising a first mode, in which a plurality of pieces of print information included in a product and groups, including the plurality of pieces of print information, are identified, and a second mode, in which a plurality of pieces of print information belonging to a group and print products, including the plurality of pieces of print information, are identified, and a display control unit that, if the reception unit receives the instruction to switch the display mode, identifies group identification information or product identification information selected by an operator, and displays the identified identification information differently from other pieces of identification information of a same type in a new display mode.

7 Claims, 23 Drawing Sheets

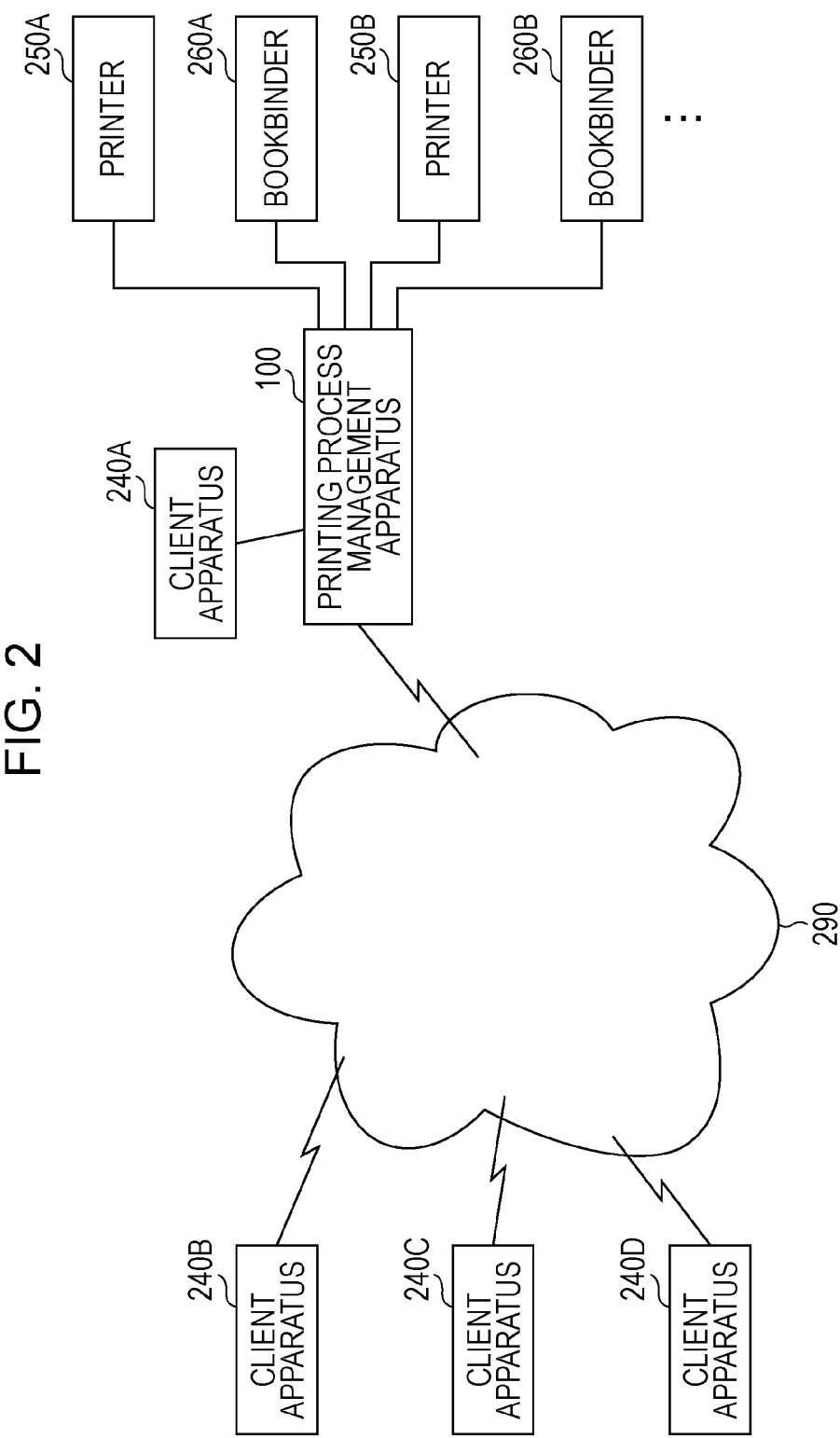

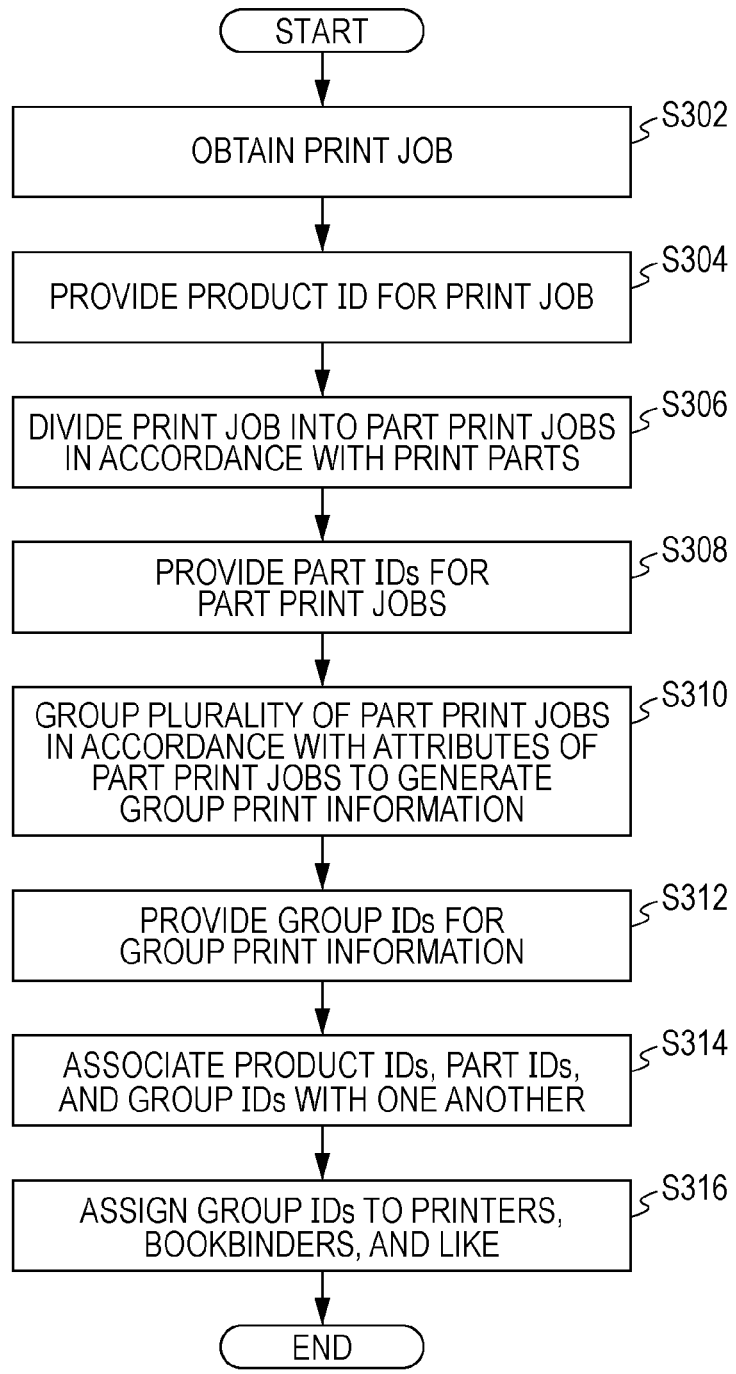

FIG. 4A

| REQUEST TIME | PRINT JOB NAME | CLIENT ID | DEADLINE | No. OF COPIES | No. OF PAGES | No. OF PARTS | No. OF PAGES OF PART A | SHEET TYPE OF PART A | PART A COLOR/ MONOCHROME PRINTING | PART A PRINT DATA | ... |
|---|---|---|---|---|---|---|---|---|---|---|---|
| 410 | 415 | 420 | 425 | 430 | 435 | 440 | 445 | 450 | 455 | 460 | 400 |

FIG. 4B

| PRODUCT ID | REQUEST TIME | PRINT JOB NAME | CLIENT ID | DEADLINE | No. OF COPIES | No. OF PAGES | No. OF PARTS | No. OF PAGES OF PART A | SHEET TYPE OF PART A | PART A COLOR/ MONOCHROME PRINTING | PART A PRINT DATA | ... |
|---|---|---|---|---|---|---|---|---|---|---|---|---|
| 405 | 410 | 415 | 420 | 425 | 430 | 435 | 440 | 445 | 450 | 455 | 460 | 470 |

FIG. 5A

| 510 | 515 | 520 | 525 | 530 |
|---|---|---|---|---|
| PRODUCT ID | No. OF PAGES OF PART A | SHEET TYPE OF PART A | PART A COLOR/ MONOCHROME PRINTING | PART A PRINT DATA |
| | | | | |

| 505 | 510 | 515 | 520 | 525 | 530 |
|---|---|---|---|---|---|
| PART ID | PRODUCT ID | No. OF PAGES OF PART A | SHEET TYPE OF PART A | PART A COLOR/ MONOCHROME PRINTING | PART A PRINT DATA |
| | | | | | |

| 610 | 615 | 600 |
|---|---|---|
| No. OF PARTS | PART ID | .... |
|  |  |  |

FIG. 6B

| 605 | 610 | 615 | 670 |
|---|---|---|---|
| GROUP ID | No. OF PARTS | PART ID | .... |
|  |  |  |  |

FIG. 13

PRODUCT MANAGEMENT SCREEN — 1300

| PRODUCT ID 1315 | PART ID 1320 | GROUP ID 1325 | STATUS 1330 | PRINTER 1335 | SHIPMENT ID 1340 |
|---|---|---|---|---|---|
| Prd1 | | | | PRINTER A | Shp1 |
| | | | | PRINTER A | |
| | | | | PRINTER B | |
| Prd2 | | | | PRINTER A | Shp1 |
| | | | | PRINTER B | |
| Prd3 | | | | PRINTER A | Shp1 |
| Prd4 | Prt1 | G3 | PRINTING | | |
| | | | | | |

1360 — NEW SCREEN CANDIDATES
1. GROUP MANAGEMENT SCREEN
2. POST-PROCESSING MANAGEMENT SCREEN
3. PRINT MANAGEMENT SCREEN
4. SHIPMENT MANAGEMENT SCREEN 1350
1310

FIG. 14

GROUP MANAGEMENT SCREEN — 1400

| GROUP ID 1415 | PRODUCT ID 1420 | PART ID 1425 | STATUS 1430 | PRINTER 1435 | SHIPMENT ID 1440 |
|---|---|---|---|---|---|
| G1 | Prd1 | Prt1 | PRINTING | PRINTER A | Shp1 |
|  | Prd1 | Prt2 | PRINTING |  |  |
|  | Prd2 | Prt1 | PRINTING |  |  |
|  | Prd2 | Prt2 | PRINTING |  |  |
| G2 | Prd1 | Prt3 | PRINTING COMPLETE | PRINTER B | Shp1 |
|  | Prd2 | Prt3 | PRINTING COMPLETE |  |  |
| G3 | Prd3 | Prt1 | PRINTING | PRINTER A | Shp1 |
|  | Prd4 | Prt1 | PRINTING |  |  |

SHIPMENT MANAGEMENT SCREEN — 1500

| SHIPMENT ID 1515 | PRODUCT ID 1520 | PRODUCT STATUS 1525 | SHIPMENT STATUS 1530 | DELIVERY ADDRESS 1535 | EXPECTED TIME OF DELIVERY 1540 |
|---|---|---|---|---|---|
| Shp1 | Prd3 | PRINTING | PACKING | 〒123-4567 | 1/1/2018 |
|  | Prd2 | BOOKBINDING |  |  |  |
|  | Prd1 | PACKING COMPLETE |  |  |  |
|  | Prd4 | PRINTING |  |  |  |
| Shp2 | Prd5 | PRINTING COMPLETE | PACKING | 〒222-2222 |  |
|  | Prd6 | PRINTING COMPLETE |  |  |  |
| Shp3 | Prd7 | PRINTING | PACKING | 〒333-3333 |  |
|  | Prd8 | PRINTING |  |  |  |

FIG. 17

PRODUCT MANAGEMENT SCREEN 1700

| PRODUCT ID 1715 | PART ID 1720 | GROUP ID 1725 | STATUS 1730 | PRINTER 1735 | SHIPMENT ID 1740 |
|---|---|---|---|---|---|
| Prd1 | Prt1 | G1 | PRINTING | PRINTER A | Shp1 |
| | Prt2 | G1 | PRINTING | PRINTER A | |
| | Prt3 | G2 | PRINTING COMPLETE | PRINTER B | |
| Prd2 | Prt1 | G1 | PRINTING | PRINTER A | Shp1 |
| | Prt2 | G1 | PRINTING | PRINTER A | |
| | Prt3 | G2 | PRINTING COMPLETE | PRINTER B | |
| | | | | | |
| | | | | | |
| | | | | | |
| | | | | | |

GROUP MANAGEMENT SCREEN — 1800

1810 → (header row)

| GROUP ID 1815 | PRODUCT ID 1820 | PART ID 1825 | STATUS 1830 | PRINTER 1835 | SHIPMENT ID 1840 |
|---|---|---|---|---|---|
| G1 | Prd1 | Prt1 | PRINTING | PRINTER A | Shp1 |
|  | Prd1 | Prt2 | PRINTING |  |  |
|  | Prd2 | Prt1 | PRINTING |  |  |
|  | Prd2 | Prt2 | PRINTING |  |  |
| G2 | Prd1 | Prt3 | PRINTING COMPLETE | PRINTER B | Shp1 |
|  | Prd2 | Prt3 | PRINTING COMPLETE |  |  |
|  |  |  |  |  |  |
|  |  |  |  |  |  |
|  |  |  |  |  |  |
|  |  |  |  |  |  |

GROUP MANAGEMENT SCREEN — 1900

| GROUP ID | PRODUCT ID | PART ID | STATUS | PRINTER | SHIPMENT ID |
|---|---|---|---|---|---|
| G1 | Prd1 | Prt1 | PRINTING | PRINTER A | Shp1 |
| | Prd1 | Prt2 | PRINTING | | |
| | Prd2 | Prt1 | PRINTING | | |
| | Prd2 | Prt2 | PRINTING | | |
| G2 | Prd1 | Prt3 | PRINTING COMPLETE | PRINTER B | Shp1 |
| | Prd2 | Prt3 | PRINTING COMPLETE | | |

FIG. 20

PRODUCT MANAGEMENT SCREEN

| PRODUCT ID | PART ID | GROUP ID | STATUS | PRINTER | SHIPMENT ID |
|---|---|---|---|---|---|
| Prd1 | Prt1 | G1 | PRINTING | PRINTER A | Shp1 |
|  | Prt2 | G1 | PRINTING | PRINTER A |  |
|  | Prt3 | G2 | PRINTING COMPLETE | PRINTER B |  |
| Prd2 | Prt1 | G1 | PRINTING | PRINTER A | Shp1 |
|  | Prt2 | G1 | PRINTING | PRINTER A |  |
|  | Prt3 | G2 | PRINTING COMPLETE | PRINTER B |  |

FIG. 21

PRODUCT MANAGEMENT SCREEN — 2100, 2110

| PRODUCT ID | PART ID | GROUP ID | STATUS | PRINTER | SHIPMENT ID |
|---|---|---|---|---|---|
| Prd1 | Prt1 | G1 | PRINTING | PRINTER A | Shp1 |
|  | Prt2 | G1 | PRINTING | PRINTER A |  |
|  | Prt3 | G2 | PRINTING COMPLETE | PRINTER B |  |
| Prd2 | Prt1 | G1 | PRINTING | PRINTER A | Shp1 |
|  | Prt2 | G1 | PRINTING | PRINTER A |  |
|  | Prt3 | G100 | PRINTING COMPLETE | PRINTER B |  |

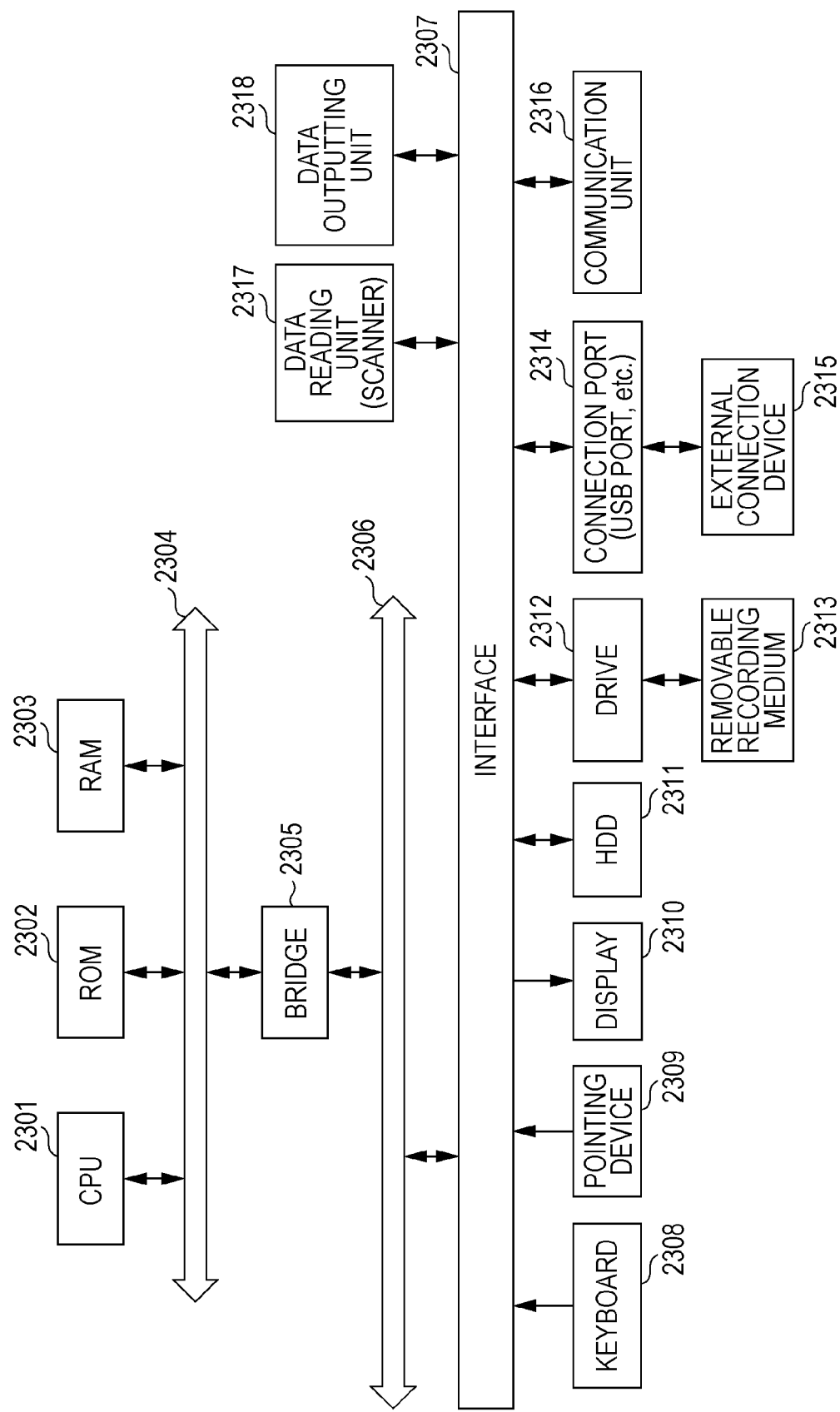

PRINTING PROCESS MANAGEMENT APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-111145 filed Jun. 11, 2018.

BACKGROUND

(i) Technical Field

The present disclosure relates to a printing process management apparatus and a non-transitory computer readable medium.

(ii) Related Art

Japanese Unexamined Patent Application Publication No. 2017-049848 discloses an information processing apparatus that easily manages the progress of production of each of deliverables produced through a plurality of steps and the progress of each of the plurality of steps and a method for controlling the information processing apparatus. The information processing apparatus includes a first generation unit that generates a display screen whose display columns correspond to the deliverables produced through the plurality of steps, a second generation unit that generates a display screen whose display columns correspond to the steps, a display control unit that displays either the display screen generated by the first generation unit or the display screen generated by the second generation unit, and a switching unit that switches the display screen generated by the first generation unit to the display screen generated by the second generation unit or the display screen generated by the second generation unit to the display screen generated by the first generation unit.

SUMMARY

As a result of the elimination of paper and the spread of electronic publication, a printing industry now does not perform large-scale print jobs, such as publication of a large number of copies, as frequently as before. Accordingly, operating rates of processing apparatuses that perform processes for printing a large number of copies (printing process), which are typified by offset presses decrease, thereby increasing printing costs. In order to increase operating rates of printing apparatuses, so-called "group jobs", in which a plurality of small-scale print jobs, such as printing of a small number of copies, are grouped and processed as a large-scale print job, is attracting attention.

By employing group jobs, an operating rate of each printing process processing apparatus improves. A single print job (group job), however, might include a plurality of print jobs whose clients are different from one another or a plurality of print jobs whose deadlines are different from one another. In other words, a single print job is divided into a plurality of print jobs and processed. For this reason, in a group job, it is difficult to understand a printing state (status), that is, it is difficult to identify a printing process in which a print job for a certain client is being processed.

Aspects of non-limiting embodiments of the present disclosure relate to a printing process management apparatus and a non-transitory computer readable medium capable of easily understanding printing states of original print jobs even in the case of a group job including a plurality of different print jobs.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a printing process management apparatus including a display unit that displays product identification information regarding a print product, including print information, and group identification information regarding a group, including the print information as a processing unit, while associating the product identification information and the group identification information with each other, a reception unit that receives an instruction to switch a display mode of the display unit and displays management information indicating a processing state of print information in one of at least two display modes comprising a first mode, in which a plurality of pieces of print information included in a product and groups, including the plurality of pieces of print information, are identified, and a second mode, in which a plurality of pieces of print information belonging to a group and print products, including the plurality of pieces of print information, are identified, and a display control unit that, if the reception unit receives the instruction to switch the display mode, identifies group identification information or product identification information selected by an operator, and displays the identified identification information differently from other pieces of identification information of a same type in a new display mode.

BRIEF DESCRIPTION OF THE DRAWINGS

An exemplary embodiment of the present disclosure will be described in detail based on the following figures, wherein:

FIG. 2 is a diagram illustrating an example of a system configuration according to the exemplary embodiment;

FIG. 3 is a flowchart illustrating an example of a process according to the exemplary embodiment;

FIGS. 4A and 4B are diagrams illustrating an example of the data structure of a print job table and a product print job table;

FIGS. 5A and 5B are diagrams illustrating an example of the data structure of a part table and a part print job table;

FIGS. 6A and 6B are diagrams illustrating an example of the data structure of a same attribute part table and a group table;

FIG. 13 is a diagram illustrating an example of processing according to the exemplary embodiment;

FIG. 14 is a diagram illustrating an example of processing according to the exemplary embodiment;

FIG. 15 is a diagram illustrating an example of processing according to the exemplary embodiment;

FIG. 17 is a diagram illustrating an example of processing according to the exemplary embodiment;

FIG. 18 is a diagram illustrating an example of processing according to the exemplary embodiment;

FIG. 19 is a diagram illustrating an example of processing according to the exemplary embodiment;

FIG. 20 is a diagram illustrating an example of processing according to the exemplary embodiment;

FIG. 21 is a diagram illustrating an example of processing according to the exemplary embodiment;

FIG. 23 is a block diagram illustrating an example of the hardware configuration of a computer that implements the exemplary embodiment.

DETAILED DESCRIPTION

First, techniques and the like that form the basis of an exemplary embodiment will be described. The following description aims to make it easier to understand the exemplary embodiment.

In a printing industry, output apparatuses output various print products using printing workflows. Output processes are performed on the basis of various elements such as sheet types, typing attributes, required image quality levels, and types of post-processing.

The productivity of a print product in a printing process depends on skills of an operator (may be a worker, a person in charge, etc.). As elements of print products (specified sheet types, required image qualities, etc.) become complex, operators need to perform more operations during outputting, which decreases efficiency and leads to mistakes. As the number of output apparatuses managed by an operator increases, an operation load of the operator increases.

As described in the above-described example of the related art, a mechanism for reducing a load of an operator and a mechanism for managing information regarding print products and output apparatuses in an integrated manner by introducing printing workflows have been proposed. There are, however, still problems to address in order to efficiently operate output apparatuses for complex print jobs.

When a plurality of different print jobs for bookbinding in which various types of sheet are required have been received, for example, the number of paper feed means (include paper trays) might become insufficient depending on a printing apparatus, and an operator might need to replace sheets.

In addition, when a print job that involves a large number of sheets is output, the print job might be distributed among a plurality of printing apparatuses. If an operator needs to frequently replace sheets or toner for each printing apparatus, operating rates of the printing apparatuses decrease, thereby decreasing productivity and leading to mistakes.

It is desired to manage the progress of production of print products, each of which includes a plurality of print parts, and the progress of production of groups of print parts.

An exemplary embodiment of the present disclosure will be described hereinafter with reference to the drawings.

Figure 1:
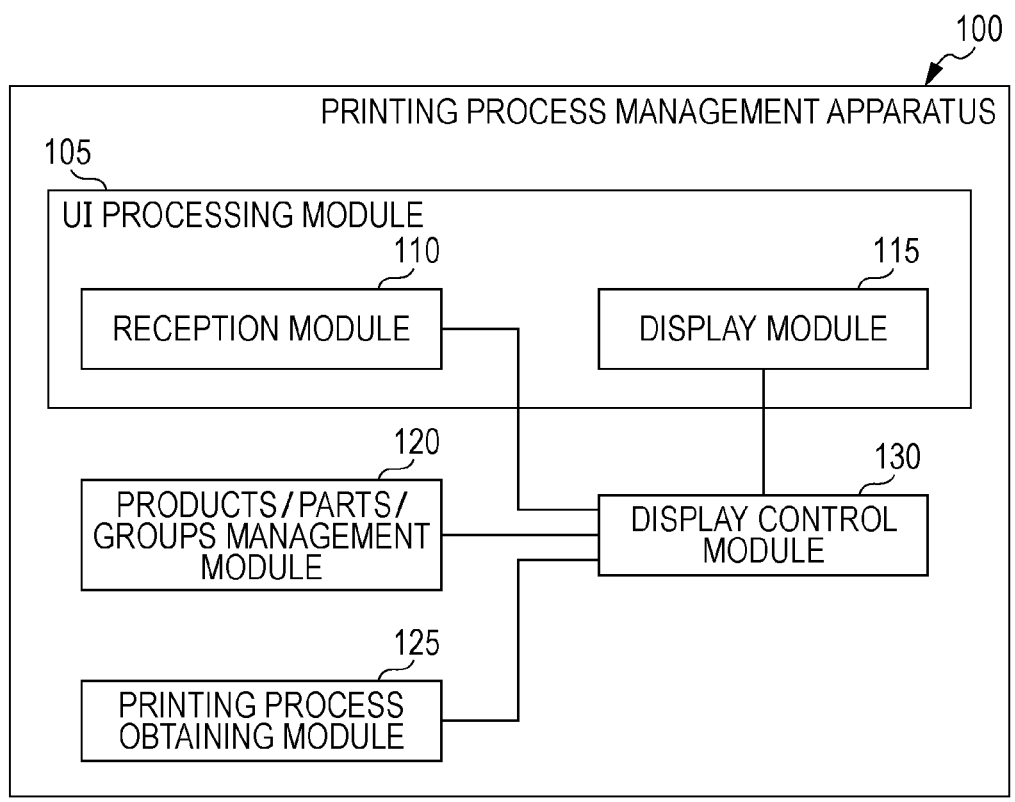
FIG. 1 is a conceptual diagram illustrating an example of the configuration of modules according to an exemplary embodiment.

FIG. 1 is a conceptual diagram illustrating an example of the configuration of modules according to the present exemplary embodiment.

A term "modules" generally refers to software (computer program) or hardware components logically separable from one another. That is, the modules in the exemplary embodiment may be not only modules achieved by computer programs but also modules included in a hardware configuration. The exemplary embodiment therefore also applies to a computer program (a program for causing a computer to perform steps, a program for causing a computer to function as means, or a program for causing a computer to achieve functions), a system, and a method for achieving these modules. Although "store", "stored" and other equivalent terms will be used for convenience of description, these terms mean, when an exemplary embodiment implements the present disclosure as a computer program, that the computer program is stored in a storage device or the storage device is controlled in such a way as to store the computer program. The modules may be in one-to-one correspondence with functions, but in practice, one module may be achieved by one program, a plurality of modules may be achieved by one program, or one module may be achieved by a plurality of programs. A plurality of modules may be executed by one computer, or one module may be executed by a plurality of computers in distributed or parallel computing. One module may include another module. In the following description, a term "connection" will be used not only for a physical connection but also for a logical connection (communication of data, issuance of instructions, reference relationships of data, login, etc.). A term "predetermined" will be used when something is determined prior to a target process. The term "predetermined" will be used not only when something is determined prior to a process according to the present exemplary embodiment but also when something is determined prior to a target step in accordance with a situation or a state at the time or a situation or a state so far, even if a process according to the present exemplary embodiment has already started. When there are a plurality of predetermined values, the values may be different from one another or two or more of the values (or all the values, obviously) may be the same. A sentence "If something is A, B is performed" means that it is determined whether something is A, and if so, B is performed. This, however, excludes a case where the determination whether something is A need not be made. In addition, when items are enumerated like "A, B, and C", these items are enumerated as examples unless otherwise specified, and it is possible that only one of the items (e.g., only A) is selected.

A system or an apparatus may be achieved by a plurality of computers, a plurality of pieces of hardware, a plurality of apparatuses, or the like connected to one another through communication means such as a network (includes a one-to-one connection) or may be achieved by a single computer, a single piece of hardware, a single apparatus, or the like. Terms "apparatus" and "system" will be used as synonyms. Needless to say, the term "system" does not imply a social mechanism (social system), which is based on a human agreement.

Target information is read from a storage device before a process or each of a plurality of processes performed by a module, and a result of the process is written to the storage device after the process is completed. Description of the reading of information from the storage device before a process and the writing of a result to the storage device after a process, therefore, might be omitted. The storage device may be a hard disk, a random-access memory (RAM), an external storage medium, a storage device through a communication line, a register of a central processing unit (CPU), or the like.

A printing process management apparatus 100 according to the present exemplary embodiment causes a printing process processing apparatuses (printers 250, bookbinders 260, etc.) to produce print products in accordance with obtained print information (at least includes printing and may also include pre-processing such as pre-pressing and post-processing such as bookbinding). As illustrated in FIG. 1, the printing process management apparatus 100 includes a user interface (UI) processing module 105, a products/parts/groups management module 120, a printing process obtaining module 125, and a display control module 130. The printing process management apparatus 100 is also called a "workflow management apparatus".

The printing process management apparatus 100 identifies printing states of original print jobs even in the case of a group job including a plurality of different print jobs.

The printing process management apparatus 100 also identifies printing states of print parts even when a plurality of print parts of a print product are processed in a plurality of different print jobs.

Relevant terms will be defined hereinafter.

A term "print product" (also referred to as a "print deliverable" or a "product") refers to an article to be delivered to a client. A print product may be, for example, a book, a leaflet, or the like.

A term "print part" (also referred to as a "part") refers to a part of a print product. A print part may be, for example, a cover or leaves of a book or the like. In general, a print product includes a plurality of print parts. There are, however, print products including only one print part, such as a leaflet.

A term "group" refers to a plurality of print parts grouped together for a printing process processing apparatus to easily perform a printing process. Print parts of a plurality of different print products may form a group. When print products can be completed by simply printing print data, such as in the case of leaflets, print products may form a group. In other words, a plurality of print jobs that can be performed by a single printing process processing apparatus may form a group.

For example, covers (an example of the print parts) of a plurality of print products are grouped, and a cut-sheet printer for covers (an example of the printing process processing apparatus) outputs the covers. In addition, sets of leaves (an example of the print parts) of the plurality of print products are grouped, and a continuous form printer for leaves (an example of the printing process processing apparatus) outputs the sets of leaves. An operator then combines the outputs (prints) of the plurality of printers to make books. At this time, the operator can identify correspondences between the print products and the print parts using information images, such as barcodes, printed in the margin of the prints.

The UI processing module 105 includes a reception module 110 and a display module 115. The UI processing module 105 performs a UI process. For example, the UI processing module 105 controls a liquid crystal display that also serves as a touch panel in such a way as to receive user operations and present messages and the like to a user. The UI processing module 105 may also receive user operations performed using a mouse, a keyboard, a camera, a microphone, or the like (such as a line of sight, gesture, sound, etc.) and present messages to the user as sounds output from a speaker or tactile sensations from a tactile device. Alternatively, the UI processing module 105 may receive user operations from a client apparatus 240 through a communication line using a web browser of the client apparatus 240 and display messages on a display device of the client apparatus 240.

The display module 115 is connected to the display control module 130. The display module 115 displays product identification information regarding a print product, including print information, and group identification information regarding a group, including the print information as a processing unit, while associating the product identification information and the group identification information with each other. The print information refers to a print job and at least includes a print attribute (job property) for identifying contents of print data and a printing process. More specifically, the display module 115 displays a management screen in which product identifiers (IDs) and group IDs are associated with each other on a list.

The reception module 110 is connected to the display control module 130. The reception module 110 receives an instruction to switch a display mode of the display module 115 and displays management information indicating a processing state of print information in one of at least two display modes, namely (1) a first mode, in which a plurality of pieces of print information included in a product and groups, including the plurality of pieces of print information, can be identified, and (2) a second mode, in which a plurality of pieces of print information belonging to a group and print products, including the plurality of pieces of print information, can be identified.

A specific example of the first mode is a product management screen that will be described with reference to FIG. 13, and a specific example of the second mode is a group management screen that will be described with reference to FIG. 14. The reception module 110 in this case receives selection on a list inside a new screen selection box that will be described with reference to FIG. 13.

The display control module 130 is connected to the reception module 110 and the display module 115 of the UI processing module 105, the products/parts/groups management module 120, and the printing process obtaining module 125. When the reception module 110 has received an instruction to switch a display mode, the display control module 130 identifies group identification information or product identification information selected by the operator and displays the identified identification information differently from other pieces of identification information of the same type in a new display mode.

A term "different pieces of identification information of the same type" specifically refers to (1) group identification information other than identified group identification information or (2) product identification information other than identified product identification information.

The products/parts/groups management module 120 is connected to the display control module 130. The products/parts/groups management module 120 manages information necessary to produce print products. For example, the products/parts/groups management module 120 manages print information, product identification information, group identification information, print part identification information, and the like using a print job table 400, a product print job table 470, a part table 500, a part print job table 570, a same attribute part table 600, and a group table 670. These pieces of information are part of the management information displayed by the display control module 130.

The printing process obtaining module 125 is connected to the display control module 130. The printing process obtaining module 125 obtains, from printing process processing apparatuses (printers 250, bookbinders 260, and the like that will be described later) that produce print products, processing states of the printing process processing apparatuses. The processing states are part of the management information displayed by the display control module 130.

The reception module 110 may also receive an instruction to switch to a display mode for managing a printing process in post-processing and later steps, as well as display modes for managing printing processes in the first and second modes.

If the reception module 110 receives an instruction to switch to the display mode for managing a printing process in post-processing and later steps, the display control module 130 may display the printing process in the post-processing and the later steps.

The display module 115 may also display print part identification information regarding print parts of a print product while associating the print part identification information with product identification information or group identification information.

If the reception module 110 receives an instruction to switch a display mode, the display control module 130 may then identify print part identification information selected by the operator and display the identified print part identification information differently from other pieces of print part identification information in a new display mode.

Alternatively, the display control module 130 may display only management information including identified group identification information or identified product identification information, details of which will be described later with reference to FIG. 16.

FIG. 2 is a diagram illustrating an example of a system configuration according to the present exemplary embodiment.

The printing process management apparatus 100 may notify, through a communication line, a client apparatus 240 of a processing state in a printing workflow.

The printing process management apparatus 100 is connected to client apparatuses 240B, 240C, and 240D through a communication line 290. The communication line 290 may be a wireless line, a wired line, or a combination of the two. For example, the communication line 290 may be the Internet, an intranet, or the like as a communication infrastructure. Functions of the printing process management apparatus 100 may be achieved as a cloud service.

The printing process management apparatus 100 is connected to a client apparatus 240A, a printer 250A, a bookbinder 260A, a printer 250B, and a bookbinder 260B. The printing process management apparatus 100 may perform a printing workflow using a plurality of printers 250 and a plurality of bookbinders 260. Other apparatuses may also be included in addition to the printers 250 and the bookbinders 260 (may include punchers and staplers). For example, an information processing apparatus that manages delivery (package tracking system) or the like may be included.

The printing workflow (steps) includes reception of a manuscript, pre-pressing, printing, post-processing, inspection, and delivery. The process is performed in this order. The printing workflow may also include other steps, or at least one of the steps (e.g., inspection) may be skipped (omitted).

FIG. 3 is a flowchart illustrating an example of a process according to the present exemplary embodiment (mainly performed by the products/parts/groups management module 120).

In step S302, a print job (print information) is obtained.

In step S304, product IDs (product identification information) are provided for the print job.

For example, the print job table 400 is obtained in step S302, and the product print job table 470 is generated in step S304. FIGS. 4A and 4B are diagrams illustrating an example of the data structure of the print job table 400 and the product print job table 470.

FIG. 4A is a diagram illustrating an example of the data structure of the print job table 400. The print job table 400 includes a request time field 410, a print job name field 415, a client ID field 420, a deadline field 425, a number of copies field 430, a number of pages field 435, a number of parts field 440, a number of pages of part A field 445, a sheet type of part A field 450, a part A color/monochrome printing field 455, and a part A print data field 460. The request time field 410 stores a request time (year, month, date, hour, minute, second, sub-second, or a combination of these). The print job name field 415 stores a name of a print job. The client ID field 420 stores information (client ID) for uniquely identifying a client (or a client apparatus 240) in the present exemplary embodiment. The deadline field 425 stores a deadline for a corresponding print product. The number of copies field 430 stores the number of copies (of a book). The number of pages field 435 stores the number of pages (of a book). The number of parts field 440 stores the number of parts. Sets of the fields from the number of pages of part A field 445 to the part A print data field 460 as many as the number of parts follow. The number of pages of part A field 445 stores the number of parts of part A. The sheet type of part A field 450 stores a sheet type of part A (e.g., information indicating thick paper, standard paper, or the like). The part A color/monochrome printing field 455 stores information indicating whether part A is subjected to color printing or monochrome printing. The part A print data field 460 stores print data regarding part A (data indicating details of printing to be performed on part A; e.g., a file format such as portable document format (PDF)). Part A may be, for example, a spine. Alternatively, part A may be an endpaper, a title page, leaves, a back cover, a cover, a leaflet, or the like.

FIG. 4B is a diagram illustrating an example of the data structure of the product print job table 470.

The product print job table 470 has a data structure obtained by adding a product ID field 405 to the print job table 400. That is, the product print job table 470 includes the product ID field 405, the request time field 410, the print job name field 415, the client ID field 420, the deadline field 425, the number of copies field 430, the number of pages field 435, the number of parts field 440, the number of pages of part A field 445, the sheet type of part A field 450, the part A color/monochrome printing field 455, and the part A print data field 460. The product ID field 405 stores information (product ID) for uniquely identifying a product in the present exemplary embodiment.

In step S306, the print job is divided into part print jobs in accordance with print parts included in the print job.

In step S308, parts IDs (print part identification information) are provided for the part print jobs.

For example, the part table 500 is generated in step S306, and the part print job table 570 is generated in step S308.

FIGS. 5A and 5B are diagrams illustrating an example of the data structure of the part table 500 and the part print job table 570.

FIG. 5A is a diagram illustrating an example of the data structure of the part table 500. The part table 500 includes a product ID field 510, a number of pages of part A field 515, a sheet type of part A field 520, a part A color/monochrome printing field 525, and a part A print data field 530. The product ID field 510 stores a product ID. The number of pages of part A field 515 corresponds to the number of pages of part A field 445 of the print job table 400 and stores the number of pages of part A. The sheet type of part A field 520 corresponds to the sheet type of part A field 450 of the print job table 400 and stores the sheet type of part A. The color/monochrome printing field 525 corresponds to the part A color/monochrome printing field 455 of the print job table 400 and stores information indicating whether part A is subjected to color printing or monochrome printing. The part A print data field 530 corresponds to the part A print data field 460 of the print job table 400 and stores the print data regarding part A.

FIG. 5B is a diagram illustrating an example of the data structure of the part print job table 570.

The part print job table 570 has a data structure obtained by adding a part ID field 505 to the part table 500. That is, the part print job table 570 includes the part ID field 505, the product ID field 510, the number of pages of part A field 515, the sheet type of part A field 520, the color/monochrome printing field 525, and the part A print data field 530. The part ID field 505 stores information (part ID) for uniquely identifying a part in the present exemplary embodiment.

In step S310, the part print jobs are grouped in accordance with attributes thereof to generate group print information.

In step S312, group IDs (group identification information) are provided for the group print information.

For example, the same attribute part table 600 is generated in step S310, and the group table 670 is generated in step S312. FIGS. 6A and 6B are diagrams illustrating an example of the data structure of the same attribute part table 600 and the group table 670.

FIG. 6A is a diagram illustrating an example of the data structure of the same attribute part table 600.

The same attribute part table 600 includes a number of parts field 610, a part ID field 615, and the like. The number of parts field 610 stores the number of parts. Part ID fields 615 as many as the number of parts follow. Each part ID field 615 stores a part ID.

FIG. 6B is a diagram illustrating an example of the data structure of the group table 670. The group table 670 has a data structure obtained by adding a group ID field 605 to the same attribute part table 600. That is, the group table 670 includes the group ID field 605, the number of parts field 610, the part ID field 615, and the like. The group ID field 605 stores information (group ID) for uniquely identifying a group in the present exemplary embodiment.

In step S314, the product IDs, the part IDs, and the group IDs are associated with one another. For example, the product IDs, the part IDs, and the group IDs are associated with one another using the product print job table 470, the part print job table 570, and the group table 670. Alternatively, a table in which the product IDs, the part IDs, and the group IDs are associated with one another may be generated.

In step S316, the group IDs are assigned to printers 250, bookbinders 260, and the like. More specifically, a printer 250, a bookbinder 260, and the like capable of performing printing and post-processing suitable for each group ID may be selected. For a group print job of a group ID corresponding to thick paper for a cover, for example, a printer 250 capable of performing printing on the thick paper for a cover may be selected. In other words, a printer 250 and a bookbinder 260 capable of processing the group print information are selected, and identification information regarding the selected printer 250 and bookbinder 260 and the group ID corresponding to the assigned group print information are associated with each other.

Figure 7:
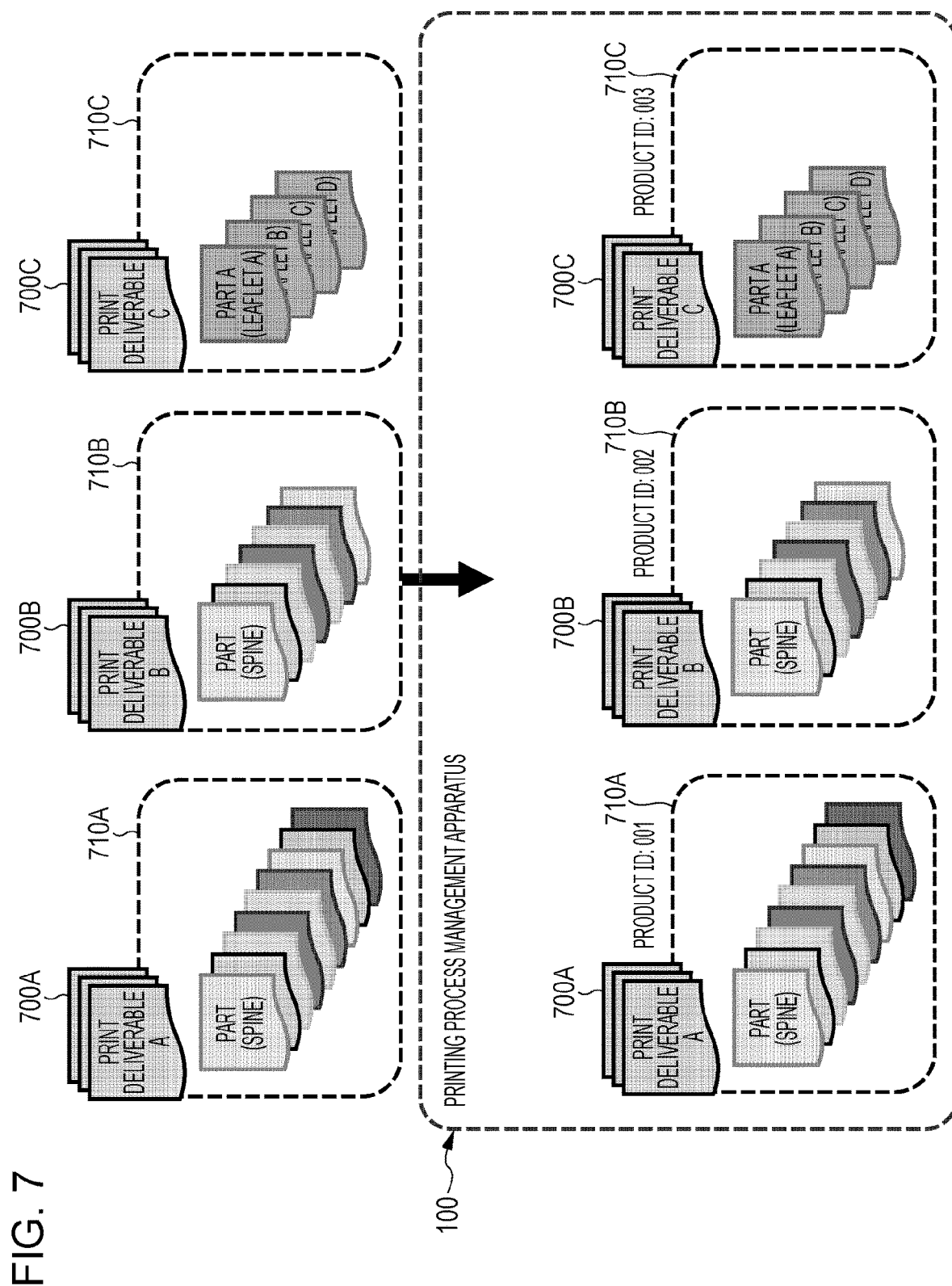
FIG. 7 is a diagram illustrating an example of processing according to the exemplary embodiment.

FIG. 7 is a diagram illustrating an example of processing according to the present exemplary embodiment. This is an example of processing especially corresponding to steps S302 and S304 in the flowchart of FIG. 3.

For example, the client apparatuses 240B, 240C, and 240D transmit print jobs 710A, 710B, and 710C, respectively, to the printing process management apparatus 100.

The printing process management apparatus 100 receives the print jobs 710A, 710B, and 710C. The print job 710A is used to obtain a print deliverable A 700A. The print job 710B is used to obtain a print deliverable B 700B. The print job 710C is used to obtain a print deliverable C 700C. Product IDs of 001, 002, and 003 are then provided for the print jobs 710A, 710B, and 710C, respectively.

Figure 8:
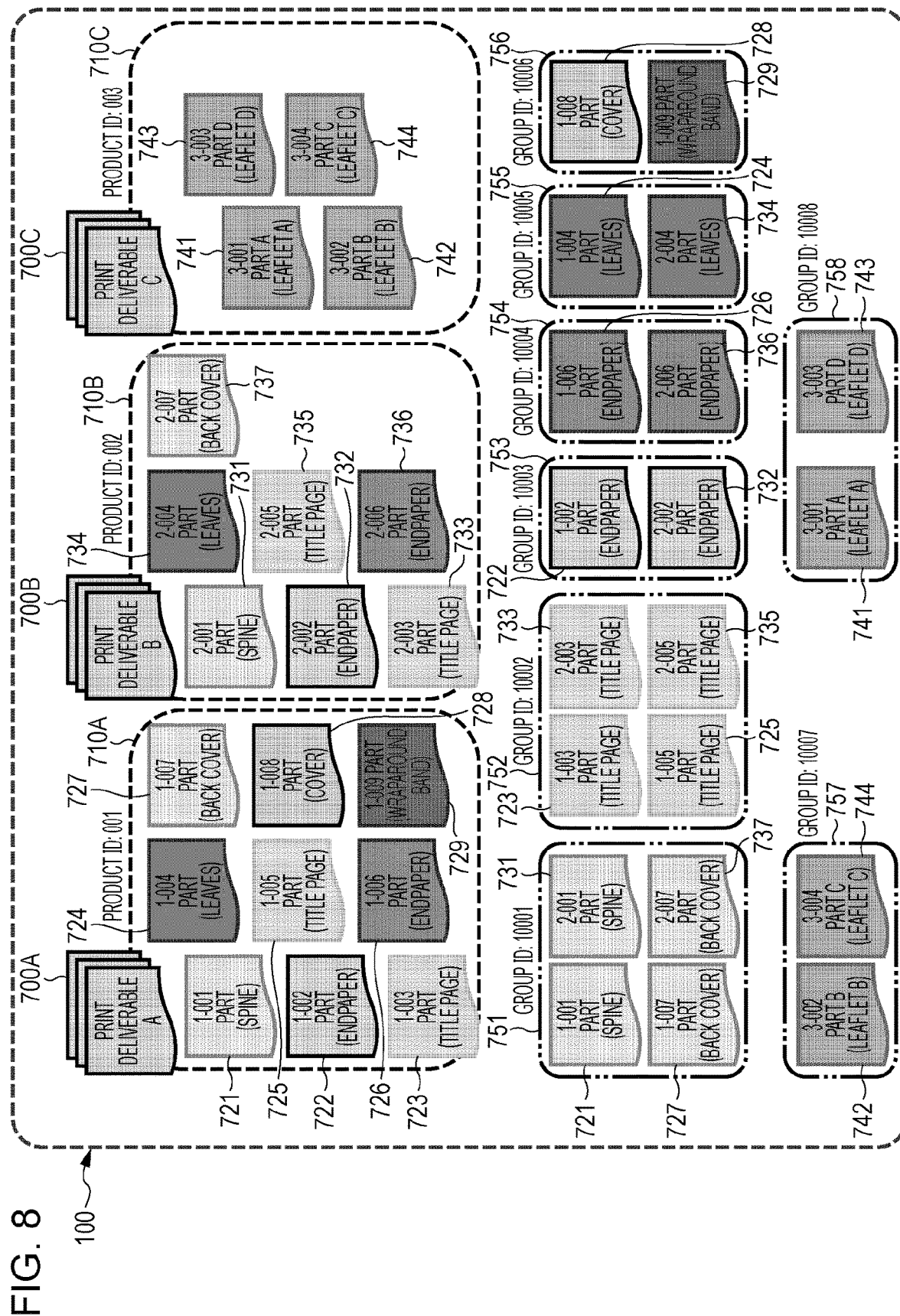
FIG. 8 is a diagram illustrating an example of processing according to the exemplary embodiment.

FIG. 8 is a diagram illustrating an example of processing according to the present exemplary embodiment. This is an example of processing especially corresponding to steps S306, S308, S310, S312, and S314 in the flowchart of FIG. 3.

First, the print jobs 710A to 710C are divided into parts, and part IDs are provided for the parts.

The print job 710A includes a 1-001 part (spine) 721, a 1-002 part (endpaper) 722, a 1-003 part (title page) 723, a 1-004 (leaves) 724, a 1-005 part (title page) 725, a 1-006 part (endpaper) 726, a 1-007 part (back cover) 727, a 1-008 part (cover) 728, and a 1-009 part (wraparound band) 729. Part IDs are provided for these parts. A part ID of 1-001, for example, is provided for the 1-001 part (spine) 721.

The print job 710B includes a 2-001 part (spine) 731, a 2-002 part (endpaper) 732, a 2-003 part (title page) 733, a 2-004 part (leaves) 734, a 2-005 part (title page) 735, a 2-006 part (endpaper) 736, and a 2-007 part (back cover) 737. Part IDs are provided for these parts.

The print job 710C includes a 3-001 part A (leaflet A) 741, a 3-002 part B (leaflet B) 742, a 3-003 part D (leaflet D) 743, and a 3-004 part C (leaflet C) 744. Part IDs are provided for these parts.

Next, these parts are classified in accordance with types of parts (an example of part print attributes) to generate groups. The types of part may be sheet types such as a sheet for a spine, a sheet for a title page, a sheet for an endpaper, a sheet for leaves, and a sheet for a leaflet.

The 1-001 part (spine) 721, the 1-007 part (back cover) 727, the 2-001 part (spine) 731, and the 2-007 part (back cover) 737 are grouped, and a group ID of 10001:751 is provided. The same sheet is used for the spines and the back covers.

The 1-003 part (title page) 723, the 1-005 part (title page) 725, the 2-003 part (title page) 733, and the 2-005 part (title page) 735 are grouped, and a group ID of 10002:752 is provided.

The 1-002 part (endpaper) 722 and the 2-002 part (endpaper) 732 are grouped, and a group ID of 10003:753 is provided.

The part 1-006 part (endpaper) 726 and the 2-006 part (endpaper) 736 are grouped, and a group ID is 10004:754 is provided.

The 1-004 part (leaves) 724 and the 2-004 part (leaves) 734 are grouped, and a group ID of 10005:755 is provided.

The 1-008 part (cover) 728 and the 1-009 part (wraparound band) 729 are grouped, and a group ID of 10006:756 is provided. The same sheet is used for the cover and the wraparound band.

The 3-002 part B (leaflet B) 742 and the 3-004 part C (leaflet C) 744 are grouped, and a group ID of 10007:757 is provided. The same sheet is used for the leaflet B and the leaflet C.

The 3-001 part A (leaflet A) 741 and the 3-003 part D (leaflet D) 743 are grouped, and a group ID of 10008:758 is provided. The same sheet is used for the leaflet A and the leaflet D.

At this time, the product IDs, the part IDs, and the group IDs have been associated with one another. More specifically, a first "1" of "1-001" of the 1-001 part (spine) 721 corresponds to the product ID of 001, and the 1-001 part (spine) 721 belongs to the group ID of 10001:751. The product IDs, the part IDs, and the group IDs are thus associated with one another.

Figure 9:
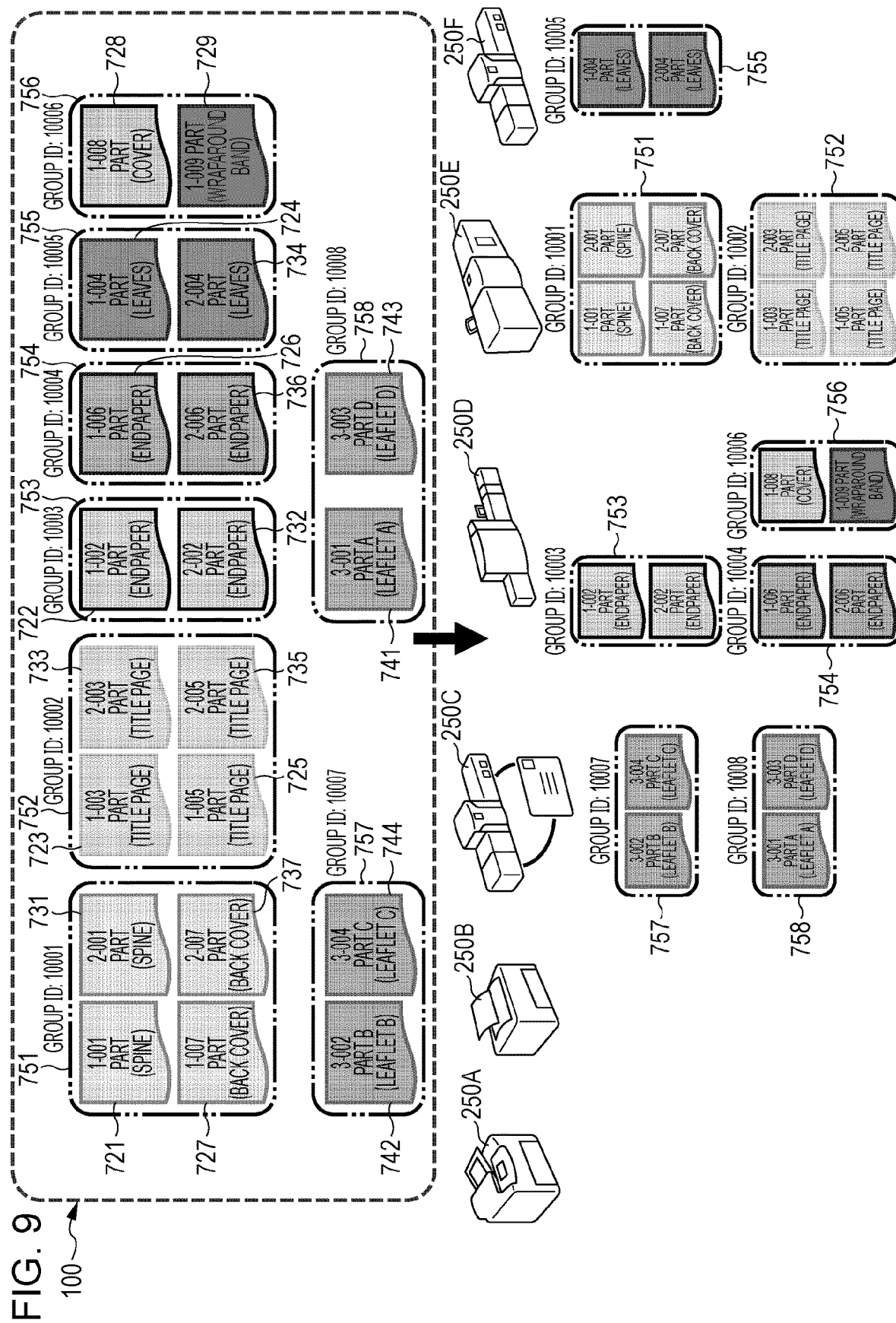
FIG. 9 is a diagram illustrating an example of processing according to the exemplary embodiment.

FIG. 9 is a diagram illustrating an example of processing according to the present exemplary embodiment.

The group IDs of 10007:757 and 10008:758 are assigned to a printer 250C. The printer 250C is a printing apparatus suitable for printing leaflets.

The group IDs of 10003:753, 10004:754, and 10006:756 are assigned to a printer 250D. The printer 250D is a printing apparatus suitable for endpapers, covers, and the like.

The group IDs of 10001:751 and 10002:752 are assigned to a printer 250E. The printer 250E is a printing apparatus suitable for spines, title pages, and the like.

The group ID of 10005:755 is assigned to a printer 250F. The printer 250F is a printing apparatus suitable for printing leaves.

Since group print jobs grouped in accordance with attributes are assigned to the printers 250, the printers 250 efficiently perform an output process. Processes such as replacement of sheets in paper feed means, for example, need to be performed less frequently than when a certain printer 250 outputs all print jobs for a print product.

Figure 10:
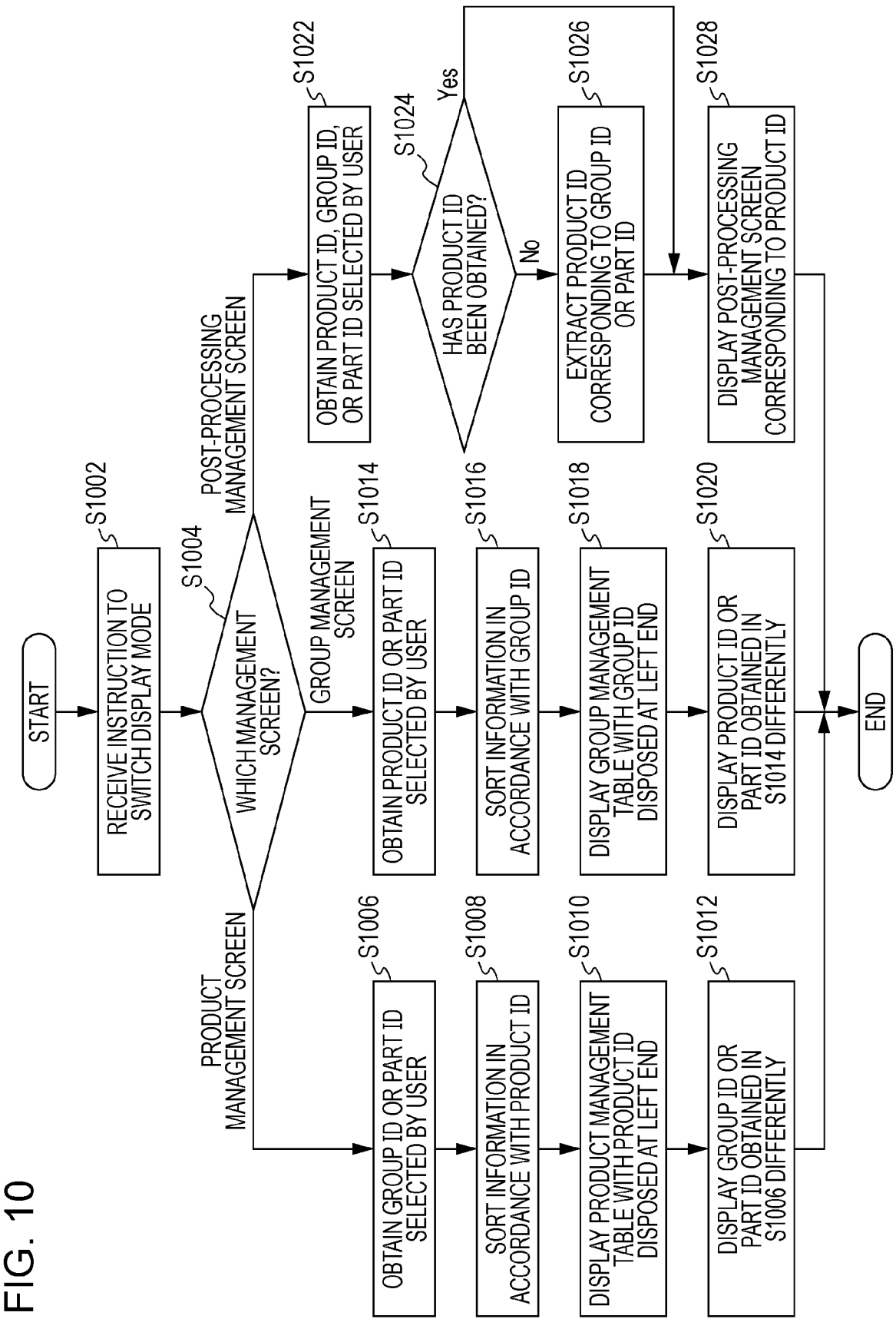
FIG. 10 is a flowchart illustrating an example of a process according to the exemplary embodiment.

FIG. 10 is a flowchart illustrating an example of a process according to the present exemplary embodiment.

In step S1002, the reception module 110 receives an instruction to switch a display mode.

In step S1004, the display control module 130 identifies a new management screen displayed as a result of the instruction to switch a display mode. If the new management screen is the product management screen, the process proceeds to step S1006. If the new management screen is the group management screen, the process proceeds to step S1014. If the new management screen is a post-processing management screen, the process proceeds to step S1022.

In step S1006, a group ID or a part ID selected by the user is obtained.

In step S1008, information is sorted in accordance with the product ID.

In step S1010, the product management table is displayed with a product ID disposed at a left end.

In step S1012, the group ID or the part ID obtained in step S1006 is displayed differently from other group IDs or part IDs.

In step S1014, a product ID or a part ID selected by the user is obtained.

In step S1016, information is sorted in accordance with the group ID.

In step S1018, the group management table is displayed with the group ID disposed at a left end.

In step S1020, the product ID or the part ID obtained in step S1014 is displayed differently from other product IDs or part IDs.

In step S1022, a product ID, a group ID, or a part ID selected by the user is obtained.

In step S1024, whether a product ID has been obtained is determined. If so, the process proceeds to step S1026, and if not, the process proceeds to step S1028.

In step S1026, a product ID corresponding to the group ID or the part ID is extracted.

In step S1028, a post-processing management screen corresponding to the product ID is displayed.

If the operator selects any progress management target on a progress management screen of a certain step, for example, the printing process management apparatus 100 presents an option to switch to a progress management screen of another step.

After the progress management screen of another step is displayed, the progress management target selected in the original progress management screen is distinctly displayed.

That is, an item focused upon in a previous screen can be easily identified in a current screen.

The progress of production of a deliverable produced through a plurality of steps, therefore, can be easily managed in a plurality of different units.

Figure 11:
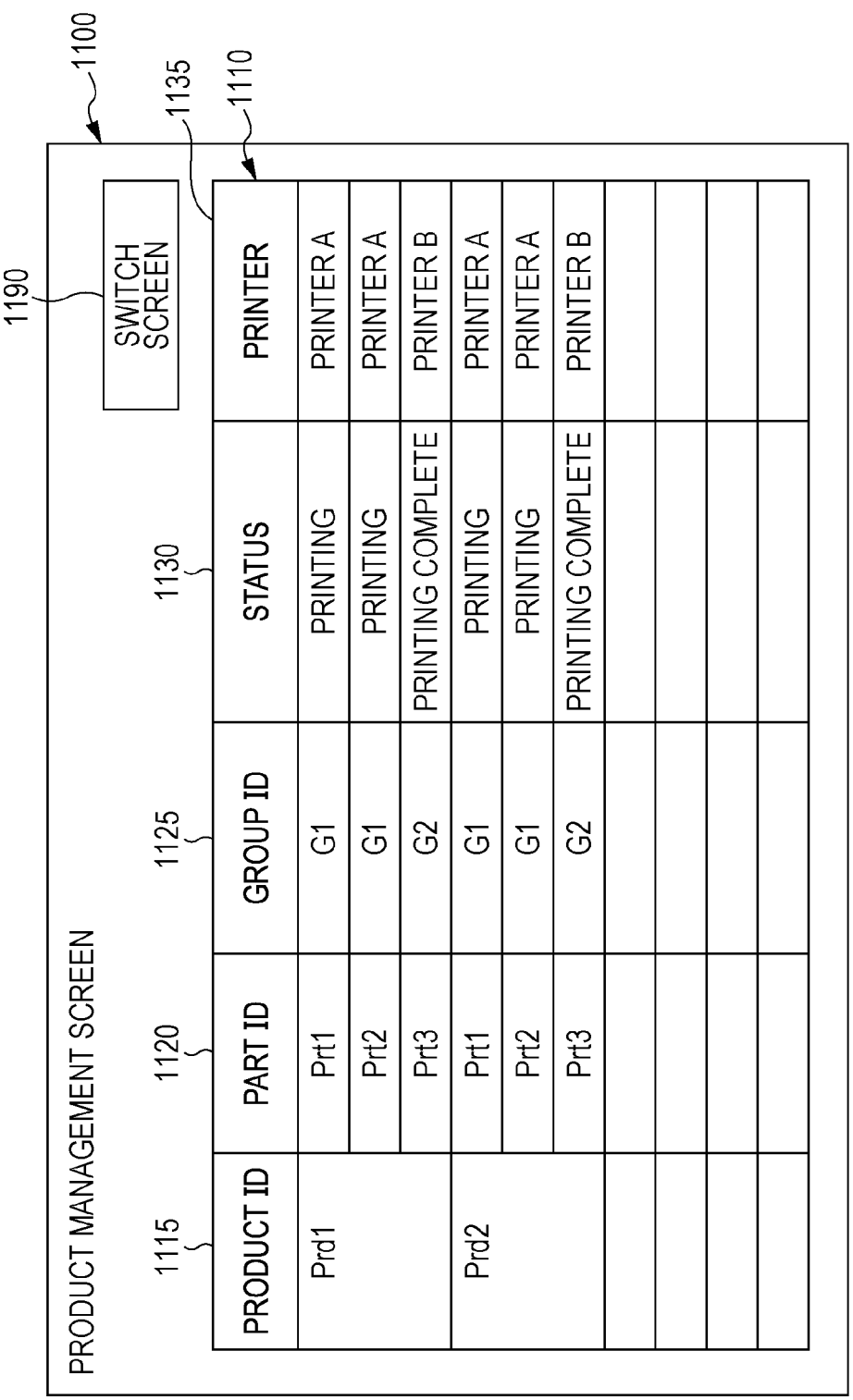
FIG. 11 is a diagram illustrating an example of a process for switching a screen in an example of the related art.

FIG. 11 is a diagram illustrating an example of a process for switching a screen in an example of the related art.

A product management screen 1100 includes a product management table 1110 and a switch screen button 1190.

The product management table 1110 includes a product ID field 1115, a part ID field 1120, a group ID field 1125, a status field 1130, and a printer field 1135. The product ID field 1115 displays product IDs. The part ID field 1120 displays part IDs of parts included in products of corresponding product IDs. The group ID field 1125 displays group IDs of groups to which parts of corresponding part IDs belong. The status field 1130 displays statuses (processing states) of processes for printing parts of corresponding part IDs. The printer field 1135 displays printer IDs for identifying printers to which parts of corresponding part IDs (or groups of corresponding group IDs) have been assigned. In the present exemplary embodiment, names of printers, such as printer A and printer B, are used as printer IDs.

Figure 12:
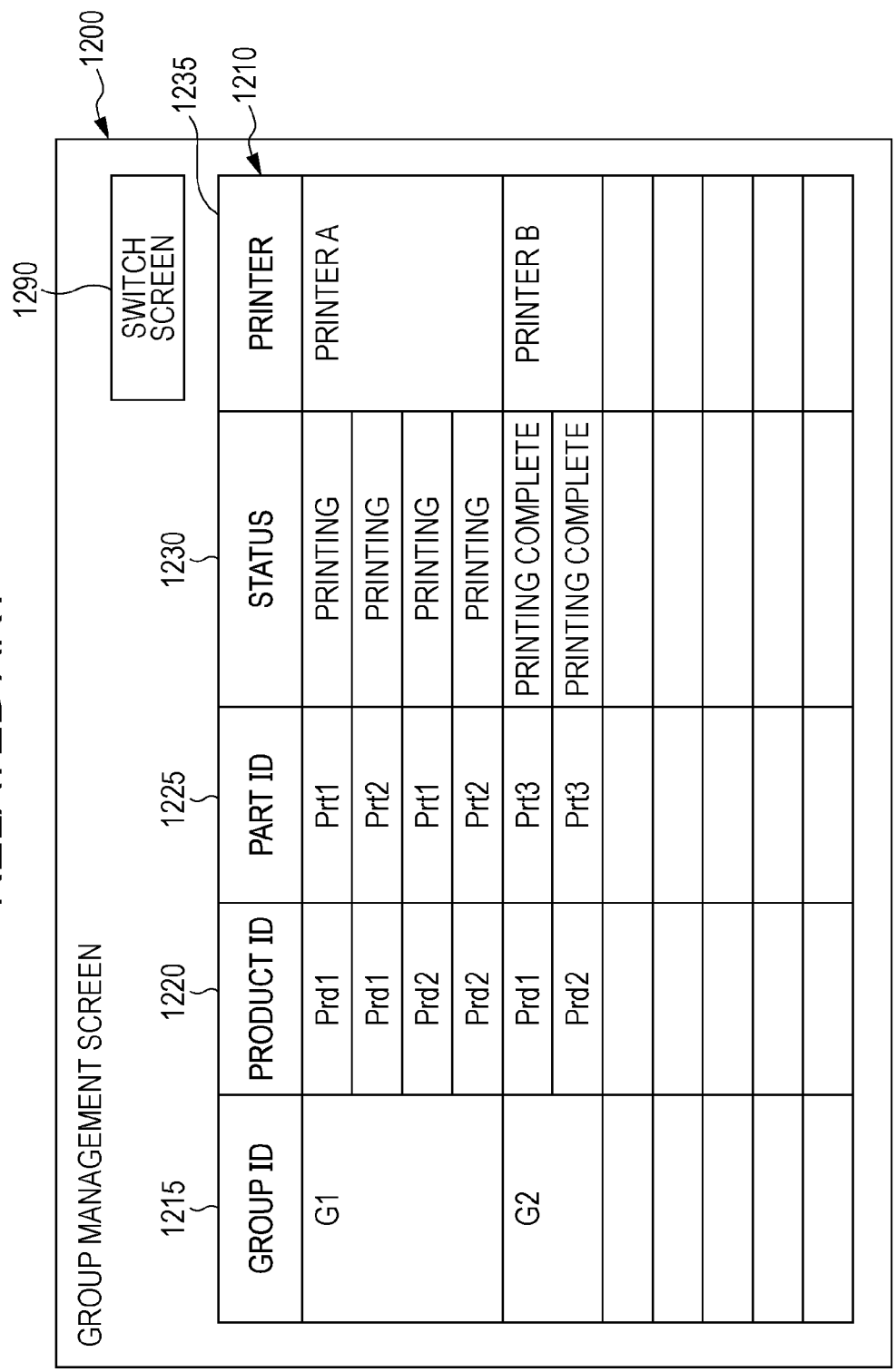
FIG. 12 is a diagram illustrating an example of a process for switching a screen in the example of the related art.

If the operator selects the switch screen button 1190, a group management screen 1200 illustrated in FIG. 12 is displayed.

FIG. 12 is a diagram illustrating an example of a process for switching a screen in the example of the related art.

The group management screen 1200 includes a group management table 1210 and a switch screen button 1290.

The group management table 1210 includes a group ID field 1215, a product ID field 1220, a part ID field 1225, a status field 1230, and a printer field 1235. The group ID field 1215 displays group IDs. The product ID field 1220 displays product IDs. The part ID field 1225 displays part IDs. The status field 1230 displays statuses. The printer field 1235 displays printer IDs (names of printers).

If the operator selects the switch screen button 1290, the product management screen 1100 illustrated in FIG. 11 is displayed.

The product management screen 1100 for managing print products is displayed in view of print products, and the group management screen 1200 for managing groups is displayed in view of groups.

If the operator desires to check a progress state of production of a part of a certain product, for example, the operator might desire to check the progress not in terms of the part itself but in terms of a group.

If the product management screen 1100 switches to the group management screen 1200, it is difficult to locate a part that the operator desires to check in the group management screen 1200.

In addition, if the operator desires to check, on the group management screen 1200, a product prd1 that the operator has focused upon on the product management screen 1100, for example, the operator needs to find the product prd1 on the group management screen 1200. Because the product prd1 has been divided into a plurality of pieces, it is difficult to find the product prd1.

In addition, when only information regarding a group to which a part belongs is displayed on the product management screen 1100, it is difficult to check states of all groups.

It is therefore desirable to be able to check states of all groups including not only a group to which a target part belongs but also groups to which the target part does not belong.

In the case of the printing process management apparatus 100, the group management screen 1200 is displayed, and all groups can be checked. It is therefore possible to identify the number of groups reserved before a group to which a target part belongs and details of the groups.

FIG. 13 is a diagram illustrating an example of processing according to the present exemplary embodiment.

A product management screen 1300 includes a product management table 1310.

The product management table 1310 includes a product ID field 1315, a part ID field 1320, a group ID field 1325, a status field 1330, a printer field 1335, and a shipment ID field 1340. The product ID field 1315 displays product IDs. The part ID field 1320 displays part IDs. The group ID field 1325 displays group IDs. The status field 1330 displays statuses. The printer field 1335 displays printer IDs (names of printers). The shipment ID field 1340 displays information (shipment IDs) for uniquely identifying shipment operations in the present exemplary embodiments.

If an operation for displaying a new screen selection box 1360 (e.g., pressing on a right button of a mouse) is detected, the new screen selection box 1360 is displayed.

In the new screen selection box 1360, for example, "1. Group management screen", "2. Post-processing management screen", "3. Print management screen", and "4. Shipment management screen" are displayed as a list.

It is assumed here that the user has selected "1. Group management screen". A group management screen 1400 illustrated in FIG. 14 is then displayed.

In this example, a cursor 1350 is disposed in a first row and a first column (a cell in which "Prd1" is displayed) of the product management table 1310, and the new screen selection box 1360 is displayed by pressing the right button of the mouse.

Text (text indicating a product ID, a group ID, a part ID, or the like) written in a cell in which the cursor 1350 is disposed when the new screen selection box 1360 is displayed is an example of a product ID, a group ID, a part ID, or the like selected by the user. Alternatively, text selected using the cursor 1350 may be an example of a product ID, a group ID, a part ID, or the like selected by the user.

FIG. 14 is a diagram illustrating an example of processing according to the present exemplary embodiment.

The group management screen 1400 includes a group management table 1410.

The group management table 1410 includes a group ID field 1415, a product ID field 1420, a part ID field 1425, a status field 1430, a printer filed 1435, and a shipment ID field 1440. The group ID field 1415 displays group IDs. The product ID field 1420 displays product IDs. The part ID field 1425 displays part IDs. The status field 1430 displays statuses. The printer field 1435 displays printer IDs (names of printers). The shipment ID field 1440 displays shipment IDs. That is, the group ID field 1415 indicating group IDs is displayed at a left end. Products including parts belonging to groups corresponding to the group IDs are displayed in a second column as the product ID field 1420. The parts belonging to the groups are displayed in a third column as the part ID field 1425. Statuses (processing states) in printing of the parts are displayed in a fourth column as the status field 1430. Printer IDs (names of printers) of printers to which the parts having part IDs (or the groups having the group IDs) have been assigned are displayed in a fifth column as the printer field 1435. Shipment operations, which are an example of post-processing, are displayed in a sixth column as the shipment ID field 1440.

For "Prd1" in the product ID field 1420, "Prd1" highlight frames 1450, 1452, and 1454 are displayed. This is because, as illustrated in FIG. 13, the operator has selected "Prd1". Although "Prd1" is highlighted in the example illustrated in FIG. 14, "Prd1" may be displayed in any manner insofar as "Prd1" is distinguished from other product IDs (Prd2, Prd3, etc.). For example, characters, figures, signs, or the like may be added, shapes, patterns, or colors may be changed, dynamic changes (e.g., Flash or other types of animation) may be employed, flashing may be performed (whether flashing occurs, a period for which flashing occurs, time intervals at which flashing occurs, and the like may be changed), or any combination of these may be employed.

Hyperlinks are embedded in identification information (group IDs, product IDs, and part IDs), and contents (group information, product information, and part information) indicated by the identification information are displayed by switching a screen through clicking.

Although a relevant column may be displayed in an original screen as detailed information regarding Prd1 without switching a screen, it is difficult to check an overall condition in this case. In the example illustrated in FIG. 14, an overall condition and individual print jobs can be simultaneously checked.

FIG. 15 is a diagram illustrating an example of processing according to the present exemplary embodiment. FIG. 15 illustrates a display example at a time when "4. Shipment management screen" has been selected in the new screen selection box 1360 illustrated in FIG. 13.

A shipment management screen 1500 includes a shipment management table 1510. The shipment management table 1510 is an example of the display mode for managing a printing process in post-processing and later steps.

The shipment management table 1510 includes a shipment ID field 1515, a product ID field 1520, a product status field 1525, a shipment status field 1530, a delivery address field 1535, and an expected time of delivery field 1540. That is, the shipment ID field 1515 indicating shipment IDs is displayed at a left end. Products corresponding to shipment operations having the shipment IDs are displayed in a second column as the product ID field 1520. Statuses of the products are displayed in a third column as the product status field 1525. Statuses of the shipment operations are displayed in a fourth column as the shipment status field 1530. Delivery addresses of the shipment operations are displayed in a fifth column as the delivery address field 1535. Expected times of delivery of the shipment operations are displayed in a sixth column as the expected time of delivery field 1540. It is needless to say that group IDs, part IDs, and the like may also be displayed.

Figure 16:
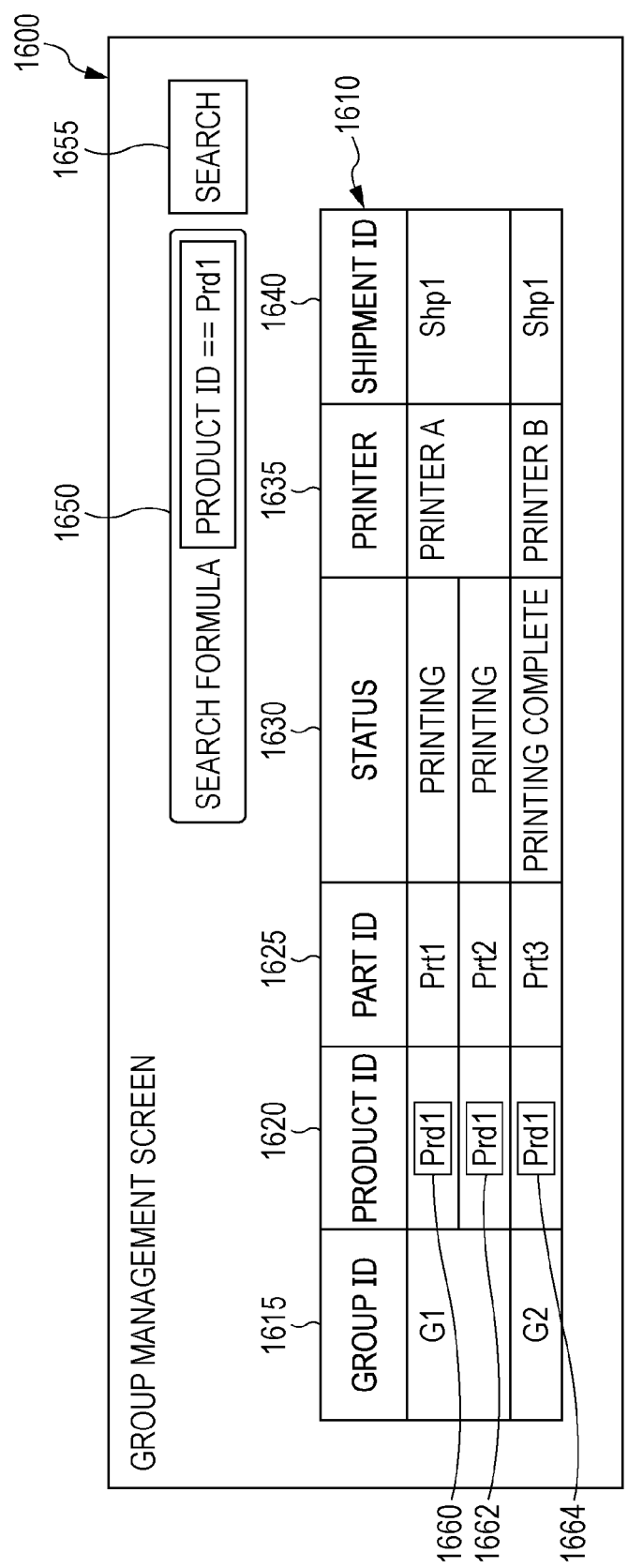
FIG. 16 is a diagram illustrating an example of processing according to the exemplary embodiment.

FIG. 16 is a diagram illustrating an example of processing according to the present exemplary embodiment.

A group management screen 1600 includes a group management table 1610, a search formula reception field 1650, and a search button 1655 are displayed. The group management table 1610 is an example of display of only management information including identified group identification information or product identification information.

The operator inputs a search formula to the search formula reception field 1650. If a search formula "product ID==Prd1" is input and the search button 1655 is selected, for example, management information whose product ID is Prd1 is displayed on the group management table 1610. That is, only "Prd1" is displayed in the product ID field 1620 while providing "Prd1" highlight frames 1660, 1662, and 1664.

It is needless to say that a search may be performed using another piece of identification information (a group ID, etc.) in the search formula reception field 1650, instead of a product ID.

FIG. 17 is a diagram illustrating an example of processing according to the present exemplary embodiment.

A product management screen 1700 includes a product management table 1710.

The product management table 1710 includes a product ID field 1715, a part ID field 1720, a group ID field 1725, a status field 1730, a printer field 1735, and a shipment ID field 1740. The product ID field 1715 displays product IDs. The part ID field 1720 displays part IDs. The group ID field 1725 displays group IDs. The status field 1730 displays statuses. The printer field 1735 displays printer IDs (names of printers). The shipment ID field 1740 displays shipment IDs.

It is assumed here that "Prd1-Prt3" is selected using a cursor 1750 and the product management screen 1700 switches to a group management screen 1800 (FIG. 18).

FIG. 18 is a diagram illustrating an example of processing according to the present exemplary embodiment. The group management screen 1800 is displayed after the product management screen 1700 illustrated in FIG. 17 is switched.

The group management screen 1800 includes a group management table 1810. The group management table 1810 includes a group ID field 1815, a product ID field 1820, a part ID field 1825, a status field 1830, a printer field 1835, and a shipment ID field 1840. The group ID field 1815 displays group IDs. The product ID field 1820 displays product IDs. The part ID field 1825 displays part IDs. The status field 1830 displays statuses. The printer field 1835 displays printer IDs (names of printers). The shipment ID field 1840 displays shipment IDs.

A part ID corresponding to "Prd1-Prt3" selected in FIG. 17 is provided with a "Prt3" highlight frame 1850.

As described above, if a part ID is selected, a combination of the selected part ID and a product ID including the part ID may be considered to have been selected. That is, since a part ID might overlap with part IDs of other products, management information corresponding to a selected part ID can be identified if a combination of a product ID and the selected part ID is used.

FIG. 19 is a diagram illustrating an example of processing according to the present exemplary embodiment.

A group management screen 1900 includes a group management table 1910.

The group management table 1910 includes a group ID field 1915, a product ID field 1920, a part ID field 1925, a status field 1930, a printer field 1935, and a shipment ID field 1940. The group ID field 1915 displays group IDs. The product ID field 1920 displays product IDs. The part ID field 1925 displays part IDs. The status field 1930 displays statuses. The printer field 1935 displays printer IDs (names of printers). The shipment ID field 1940 displays shipment IDs.

It is assumed here that "Prd1-Prt3" is selected using a cursor 1950 and the group management screen 1900 switches to a product management screen 2000 (FIG. 20).

FIG. 20 is a diagram illustrating an example of processing according to the present exemplary embodiment. The product management screen 2000 is displayed after the group management screen 1900 illustrated in FIG. 19 is switched.

The product management screen 2000 includes a product management table 2010.

The product management table 2010 includes a product ID field 2015, a part ID field 2020, a group ID field 2025, a status field 2030, a printer field 2035, and a shipment ID field 2040. The product ID field 2015 displays product IDs. The part ID field 2020 displays part IDs. The group ID field 2025 displays group IDs. The status field 2030 displays statuses. The printer field 2035 displays printer IDs (names of printers). The shipment ID field 2040 displays shipment IDs.

A part ID corresponding to "Prd1-Prt3" selected in FIG. 19 is provided with a "Prt3" highlight frame 2050.

As described above, if a part ID is selected, a combination of the selected part ID and a product ID including the part ID may be considered to have been selected. That is, since a part ID might overlap with part IDs of other products, management information corresponding to a selected part ID can be identified if a combination of a product ID and the selected part ID is used.

FIG. 21 is a diagram illustrating an example of processing according to the present exemplary embodiment.

A product management screen 2100 includes a product management table 2110.

The product management table 2110 includes a product ID field 2115, a part ID field 2120, a group ID field 2125, a status field 2130, a printer field 2135, and a shipment ID field 2140. The product ID field 2115 displays product IDs. The part ID field 2120 displays part IDs. The group ID field 2125 displays group IDs. The status field 2130 displays statuses. The printer field 2135 displays printer IDs (names of printers). The shipment ID field 2140 displays shipment IDs.

Figure 22:
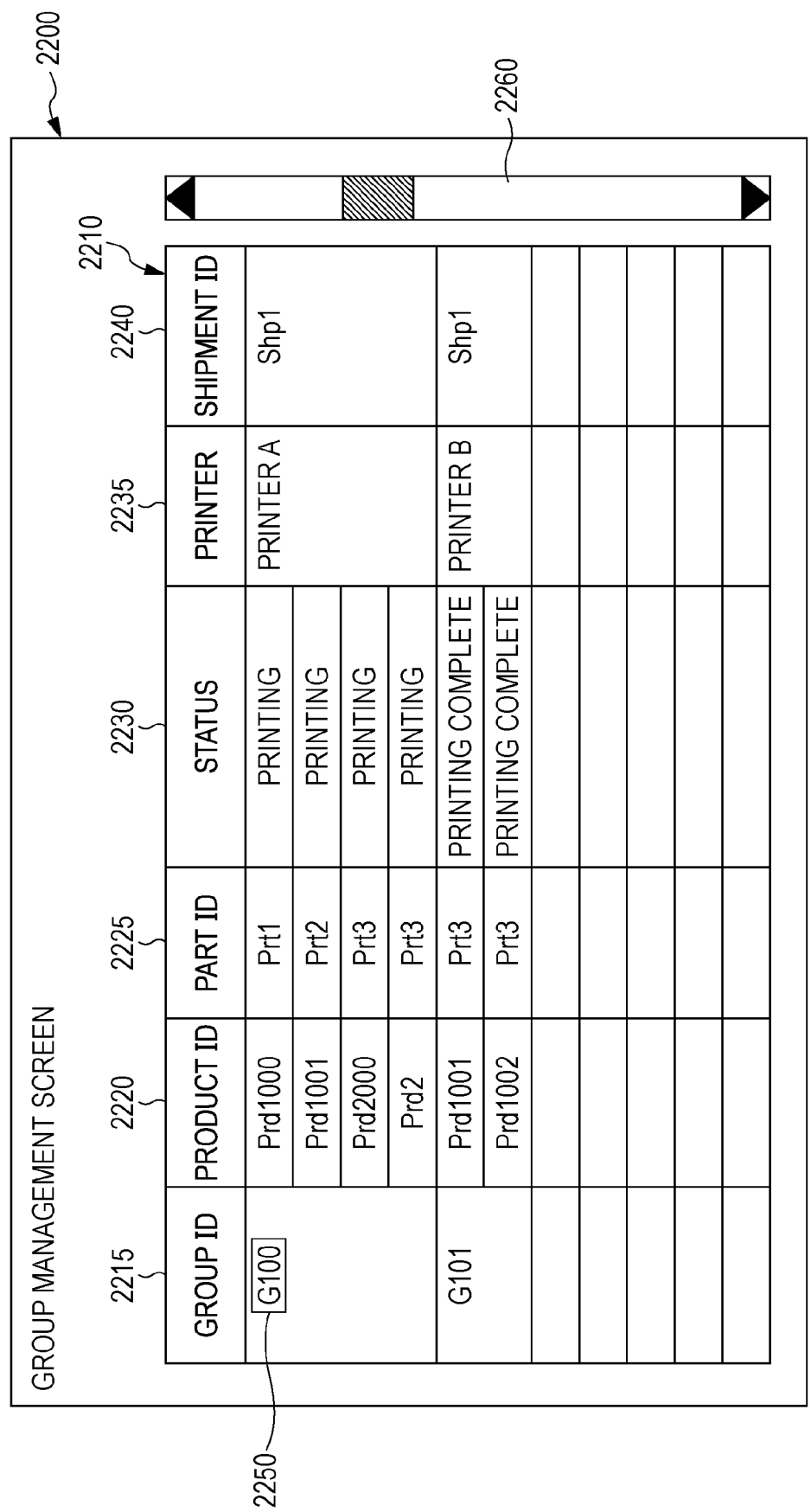
FIG. 22 is a diagram illustrating an example of processing according to the exemplary embodiment.

It is assumed here that "G100" is selected using a cursor 2150 and the product management screen 2100 switches to a group management screen 2200 (FIG. 22).

FIG. 22 is a diagram illustrating an example of processing according to the present exemplary embodiment. The group management screen 2200 is displayed after the product management screen 2100 illustrated in FIG. 21 is switched.

The group management screen 2200 includes a group management table 2210.

The group management table 2210 includes a group ID field 2215, a product ID field 2220, a part ID field 2225, a status field 2230, a printer field 2235, and a shipment ID field 2240. The group ID field 2215 displays group IDs. The product ID field 2220 displays product IDs. The part ID field 2225 displays part IDs. The status field 2230 displays statuses. The printer field 2235 displays printer IDs (names of printers). The shipment ID field 2240 displays shipment IDs. In this example, a scroll bar 2260 is displayed, and a position of the group management table 2210 in the group management screen 2200 can be identified.

A group ID corresponding to "G100" selected in FIG. 21 is provided with a "G100" highlight mark 2250.

As described above, if a group ID is selected, only the group ID may be considered to have been selected.

That is, if a product ID or a group ID is selected, only the product ID or the group ID may be considered to have been selected. If a part ID is selected, on the other hand, a combination of the selected part ID and a product ID including the part ID may be considered to have been selected.

An example of the hardware configuration of the printing process management apparatus 100 according to the present exemplary embodiment will be described with reference to FIG. 23. The configuration illustrated in FIG. 23 is achieved by a personal computer (PC) or the like, for example, and includes a data reading unit 2317 such as a scanner and a data output unit 2318 such as a printer.

A CPU 2301 is a control unit that performs processes according to computer programs that describe execution sequences of the various modules described in the above-described exemplary embodiment, namely the UI processing module 105, the products/parts/groups management module 120, the printing process obtaining module 125, the display control module 130, and the like.

A read-only memory (ROM) 2302 stores programs, arithmetic parameters, and the like to be used by the CPU 2301. A RAM 2303 stores a program to be executed by the CPU 2301 and parameters and the like that change during the execution. These components are connected to one another by a host bus 2304 such as a CPU bus.

The host bus 2304 is connected to an external bus 2306 such as a peripheral component interconnect/interface (PCI) bus through a bridge 2305.

A keyboard 2308 and a pointing device 2309 such as a mouse are devices operated by the operator. A display 2310 is a liquid crystal display device, a cathode ray tube (CRT), or the like and displays various pieces of information as text or image information. Alternatively, a touch screen or the like having functions of both the pointing device 2309 and the display 2310 may be employed. In this case, functions of a keyboard may be achieved by drawing a keyboard (a so-called "software keyboard", "screen keyboard", etc.) on the screen (touch screen), instead of physically connecting the keyboard 2309.

A hard disk drive (HDD) 2311 includes a hard disk (or a flash memory, etc.) and drives the hard disk to record or execute a program or information to be executed by the CPU 2301. The hard disk stores the print job table 400, the product print job table 470, the part table 500, the part print job table 570, the same attribute part table 600, the group table 670, and the like. The hard disk also stores various other pieces of data, various computer programs, and the like.

A drive 2312 reads data or a program recorded on a removable recording medium 2310 inserted thereinto, such as a magnetic disk, an optical disc, a magneto-optical (MO) disk, or a semiconductor memory and supplies the data or the program to the RAM 2303 connected through an interface 2307, the external bus 2306, the bridge 2305, and the host bus 2304. The removal recording medium 2313 may also be used as a data recording area.

A connection port 2314 is used to connect an external connection device 2315 and includes a connection unit such as universal serial bus (USB) port, an Institute of Electrical and Electronics Engineers (IEEE) 1394 port, or the like. The connection port 2314 is connected to the CPU 2301 and the like through the interface 2307, the external bus 2306, the bridge 2305, the host bus 2304, and the like. A communication unit 2316 is connected to a communication line and performs a process for communicating data with the outside. The data reading unit 2317 is a scanner, for example, and performs a process for reading a document. The data outputting unit 2318 is a printer, for example, and performs a process for outputting document data.

The hardware configuration of the printing process management apparatus 100 illustrated in FIG. 23 is an example, and the present exemplary embodiment is not limited to the configuration illustrated in FIG. 23. Any configuration may be employed insofar as the modules described in the above-described exemplary embodiment can be achieved. For example, some modules may be achieved by dedicated hardware (e.g., an application-specific integrated circuit (ASIC), etc.). In addition, some modules may be provided in an external system and connected by a communication line. In addition, the system illustrated in FIG. 23 may be connected to other systems of the same type by a communication line and operate in combination with the other systems. In addition, the system may be incorporated into a mobile information communication device (a mobile phone, a smartphone, a mobile device, a wearable computer, etc.), an information home appliance, a robot, a copier, a fax machine, a scanner, a printer, a multifunction peripheral (an image processing apparatus having functions of two or more of a scanner, a printer, a copier, a fax machine, and the like), or the like, instead of a PC.

Although combinations of an abbreviation "Prd", "Prt", or "G" and a value are used as product IDs, part IDs, and group IDs, which are identification information, in the above-described exemplary embodiment, names may be used, instead. The names may be provided by the operator, or names of print jobs (the print job name field 415 of the print job table 400) may be used.

The program described above may be stored in a recording medium and provided or provided using communication means. In this case, for example, the program may be regarded as constituting a non-transitory computer readable medium storing a program.

A term "non-transitory computer readable medium storing a program" refers to a non-transitory computer readable medium storing a program used to install, execute, or distribute the program.

The non-transitory computer readable medium may be, for example, a digital versatile disc (DVD)-R, a DVD-RW, a DVD-RAM, or the like specified by a DVD forum, a DVD+R, a DVD+RW, or the like specified by DVD+RW, a compact disc read-only memory (CD-ROM), a CD-recordable (CD-R), a CD-rewritable (CD-RW), a Blu-ray Disc (BD; registered trademark), an MO disk, a flexible disk (FD), a magnetic tape, a hard disk, a ROM, an electrically erasable programmable read-only memory (EEPROM), a flash memory, a RAM, a secure digital (SD) memory card, or the like.

The entirety or a part of the program may be recorded in the non-transitory computer readable medium and preserved or distributed. The program may be transferred through a wired network or a wireless network used for a local area network (LAN), a metropolitan area network (MAN), a wide area network (WAN), the Internet, an intranet, an extranet, or the like or a transfer medium such as a combination of these networks. Alternatively, the program may be transmitted on carrier waves.

Furthermore, the program may be a part or the entirety of another program, or may be recorded in a recording medium along with another program. Alternatively, the program may be divided and recorded in a plurality of recording media. In addition, the program may be compressed, encrypted, or recorded in any other mode insofar as the program can be restored.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A printing process management apparatus comprising:
a display that displays product identification information regarding a print product, including print information, and group identification information regarding a group, including the print information as a processing unit, while associating the product identification information and the group identification information with each other; and
a processor configured to:
receive an instruction to switch a display mode of the display to display management information indicating a processing state of print information in any one of at least two display modes comprising a first mode, in which a plurality of pieces of print information included in a product and groups, including the plurality of pieces of print information, are identified, and a second mode, in which a plurality of pieces of print information belonging to a group and print products, including the plurality of pieces of print information, are identified; and
if the processor receives the instruction to switch the display mode, the processor further configured to identify group identification information or product identification information selected by an operator, so as to display the identified identification information differently from other pieces of identification information of a same type in a new display mode.

2. The printing process management apparatus according to claim 1,
wherein the processor receives an instruction to switch to a display mode for managing a printing process in post-processing and later steps in addition to the display modes for managing a printing process relating to the first and second modes, and
wherein, if the processor receives the instruction to switch to the display mode for managing the printing process in the post-processing and the later steps, the printing process in the post-processing and the later steps is displayed.

3. The printing process management apparatus according to claim 1,
wherein the display also displays print part identification information regarding a print part of the print product while associating the print part identification information with the product identification information and the group identification information.

4. The printing process management apparatus according to claim 3,
wherein, if the processor receives the instruction to switch the display mode, the processor identifies print part identification information selected by the operator, so as to display the identified print part identification information differently from other pieces of print part identification information in a new display mode.

5. The printing process management apparatus according to claim 1,
wherein only management information including the identified group identification information or the identified product identification information is displayed.

6. A non-transitory computer readable medium storing a program causing a computer to execute a process for managing a printing process, the process comprising:
displaying product identification information regarding a print product, including print information, and group identification information regarding a group, including the print information as a processing unit, while associating the product identification information and the group identification information with each other;
receiving an instruction to switch a display mode in the displaying and displaying management information indicating a processing state of print information in one of at least two display modes comprising a first mode, in which a plurality of pieces of print information included in a product and groups, including the plurality of pieces of print information, are identified, and a second mode, in which a plurality of pieces of print information belonging to a group and print products, including the plurality of pieces of print information, are identified; and
identifying, if the instruction to switch the display mode is received in the receiving, group identification information or product identification information selected by an operator, and displaying the identified identification information differently from other pieces of identification information of a same type in a new display mode.

7. A printing process management apparatus comprising:
display means for displaying product identification information regarding a print product, the identification information including print information, and group identification information regarding a group, the group identification information including the print information as a processing unit, while associating the product identification information and the group identification information with each other;
reception means for receiving an instruction to switch a display mode of the display means and displaying management information indicating a processing state of print information in any one of at least two display modes comprising a first mode, in which a plurality of pieces of print information included in a product and groups, including the plurality of pieces of print information, are identified, and a second mode, in which a plurality of pieces of print information belonging to a group and print products, including the plurality of pieces of print information, are identified; and
display control means for, if the reception means receives the instruction to switch the display mode, identifying group identification information or product identification information selected by an operator, and displaying the identified identification information differently from other pieces of identification information of a same type in a new display mode.

\* \* \* \* \*